US 008753762B2

(12) United States Patent
Major et al.

(10) Patent No.: US 8,753,762 B2
(45) Date of Patent: Jun. 17, 2014

(54) THERMAL MANAGEMENT OF CABIN AND BATTERY PACK IN HEV/PHEV/BEV VEHICLES

(75) Inventors: Gregory Major, Farmington Hills, MI (US); Mark Utter, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 541 days.

(21) Appl. No.: 13/039,807

(22) Filed: Mar. 3, 2011

(65) Prior Publication Data

US 2012/0225341 A1 Sep. 6, 2012

(51) Int. Cl.
*H01M 10/50* (2006.01)
*B60H 1/00* (2006.01)

(52) U.S. Cl.
USPC .......... 429/120; 165/202; 62/238.7; 180/65.1

(58) Field of Classification Search
USPC .......... 429/120; 165/202, 240–242; 62/238.7; 180/65.1, 65.2, 65.4
See application file for complete search history.

(56) References Cited

U.S. PATENT DOCUMENTS

| 6,992,376 | B2 | 1/2006 | Jaeck |
| 7,287,581 | B2 | 10/2007 | Ziehr et al. |
| 2005/0133215 | A1 | 6/2005 | Ziehr et al. |
| 2008/0251235 | A1 | 10/2008 | Zhou |
| 2009/0071178 | A1 | 3/2009 | Major et al. |
| 2011/0212356 | A1* | 9/2011 | Tennessen et al. ............ 429/120 |
| 2011/0296855 | A1* | 12/2011 | Johnston et al. ................. 62/79 |

* cited by examiner

*Primary Examiner* — Carlos Barcena
(74) *Attorney, Agent, or Firm* — Ralph E. Smith

(57) ABSTRACT

A motor vehicle has an electric traction motor and a battery pack that provides power to the motor. The battery pack includes a plurality of battery cells. A thermal system includes a battery pack coolant loop, a cabin coolant loop, a power electronics coolant loop and a plurality of controllable valves controlled by a controller to select thermal modes by controlling flow paths of coolant in one or more of the coolant loops.

8 Claims, 2 Drawing Sheets

| Mode | Mode | Valve V1 | Valve V2 | Valve V3 | Valve V4 | Valve V5 | Note |
|---|---|---|---|---|---|---|---|
| 1 | Heat Cabin with PE waste | A | B | A | A or C | A or B | V4/V5 choices depend on if battery cooling or recirculation is desired |
| 2 | Heat Battery with PE waste | B | C | A | C | C | |
| 3 | Heat Battery with PTC heater | see note | A | B | B | A | No coolant flow through V1, V1 left unpowered |
| 4 | Heat Battery and Cabin with PTC heater | A | C | A | B | see note | No coolant flow through V5, V5 left unpowered |
| 5 | Heat Cabin with PTC heater | B | A or C | A | A or C | A, B, or C | V2/V4/V5 choices depend on if battery cooling or recirculation is desired |
| 6 | Heat Cabin & Battery with PE waste | A | C | A | B | see note | Same as mode 4, but without heater energized |

FIG-2

THERMAL MANAGEMENT OF CABIN AND BATTERY PACK IN HEV/PHEV/BEV VEHICLES

FIELD

The present invention relates to hybrid-electric, plug-in hybrid electric, and battery electric vehicles, and more particularly, to thermal management of the vehicle cabin and battery pack.

BACKGROUND

Vehicles having electric traction motors include vehicles commonly known as hybrid-electric vehicles ("HEVs"), plug-in hybrid electric vehicles ("PHEVs"), and battery electric vehicles ("BEVs"). These vehicles include thermal systems that heat and cool the cabin of the vehicle, cool the power electronics components of the electric propulsion system, and heat and cool the battery pack.

SUMMARY

In accordance with an aspect of the present disclosure, a motor vehicle has an electric traction motor and a battery pack that provides power to the motor. The battery pack includes a plurality of battery cells. A thermal system includes a battery pack coolant loop, a cabin coolant loop, a power electronics coolant loop and a plurality of controllable valves controlled by a controller to select thermal modes by controlling flow paths of coolant in one or more of the coolant loops. The controller controls the controllable valves when in a first cabin only heating mode to circulate liquid coolant through power electronics in the power electronics coolant loop and through a heater core in the cabin cooling loop to utilize heat generated by the power electronics to heat the cabin. The controller controls the controllable valves when in a second cabin only heating mode to circulate liquid coolant through an energized coolant heater in the cabin coolant loop and the heater core to utilize heat generated by the coolant heater to heat the cabin. The controller further includes a battery pack recirculation mode and controls the controllable valves when in the first or second cabin only heating mode and the battery pack recirculation mode to recirculate liquid coolant flowing in the battery pack coolant loop so that it flows through the battery pack without any thermal input other than that provided by the battery pack to maintain the battery cells of the battery pack at essentially the same temperature.

In an aspect, the controller includes a battery pack heating mode and when in the battery pack heating mode the controller controlling the controllable valves to circulate liquid coolant through the power electronics in the power electronics coolant loop and through the battery pack to heat the battery pack with heat generated by the power electronics.

In an aspect, the controller includes a second battery pack heating mode and the controller when in the second battery pack heating mode controlling the controllable valves to circulate liquid coolant through an energized coolant heater in the cabin coolant loop and the battery pack to heat the battery pack with heat generated by the energized coolant heater.

In an aspect, the controller includes a cabin and battery pack heating mode and the controller when in the cabin and battery pack heating mode controlling the controllable valves to circulate liquid coolant through the power electronics, a heater core in the cabin coolant loop and the battery pack to heat the cabin and the battery pack with heat generated by the power electronics.

In an aspect, the controller includes a second cabin and battery pack heating mode and the controller when in the second cabin and battery pack heating mode controlling the controllable valves to circulate liquid coolant through an energized coolant heater in the cabin coolant loop and through the heater core and battery pack to heat the cabin and battery pack with heat generated by the energized coolant heater.

In an aspect, the controller includes a battery pack cooling mode and the controller when in the battery pack cooling mode controlling the controllable valves when in the first or second cabin only heating mode and in the battery pack cooling mode to recirculate liquid coolant through either a battery pack radiator in the battery pack coolant loop or through a chiller in the battery pack coolant loop to cool the battery pack.

Further areas of applicability of the teachings of the present disclosure will become apparent from the detailed description, claims and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a state table showing heating and cooling modes of the coolant loops of FIG. 1.

DETAILED DESCRIPTION

Figure 1:
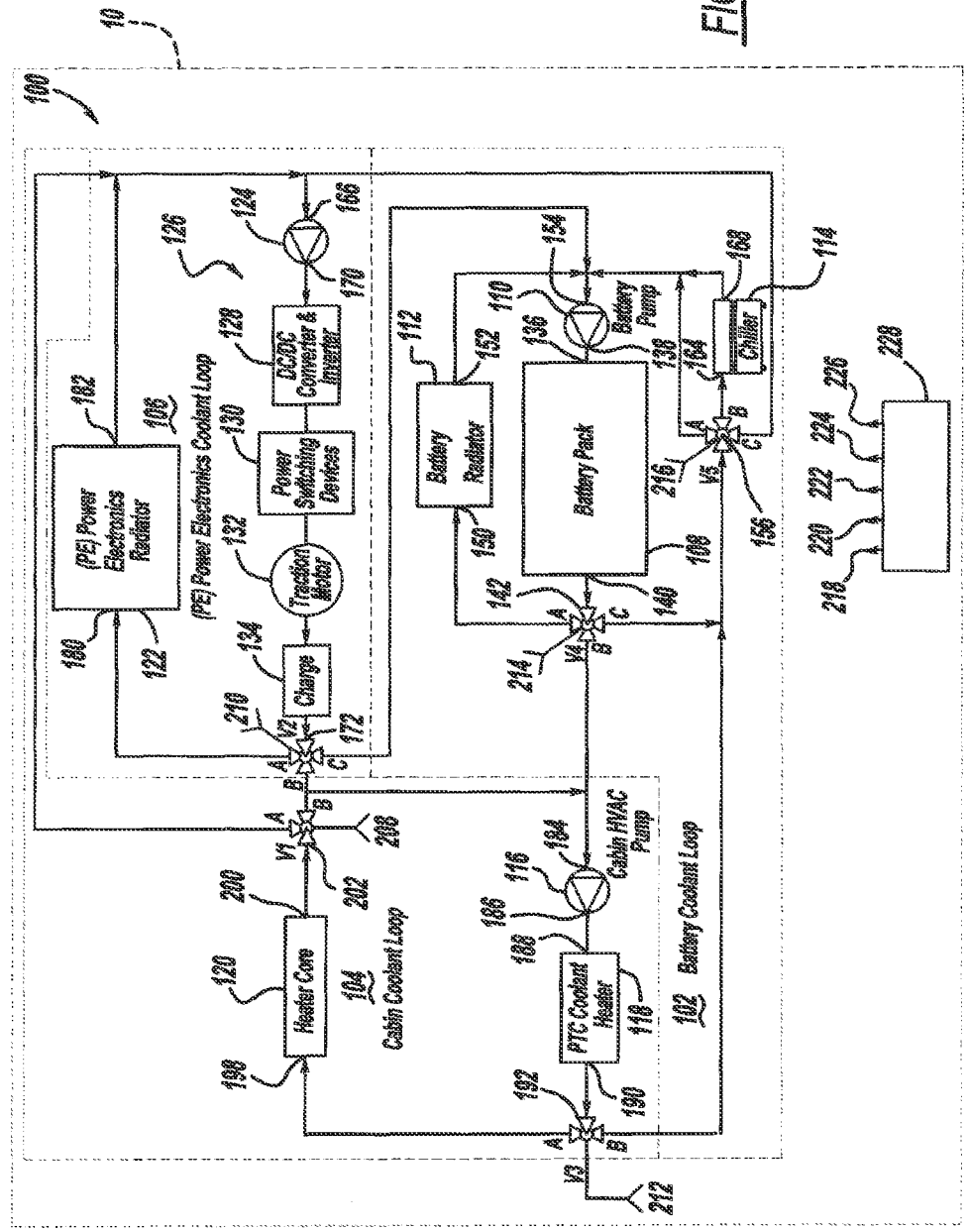
FIG. 1 is a thermal system diagram of an integrated battery thermal and occupant comfort system having a plurality of coolant loops in accordance with an aspect of the present disclosure.

In accordance with an aspect of the present disclosure, FIG. 1 shows a thermal system diagram of an integrated battery thermal and occupant comfort system 100 for hybrid-electric, plug-in hybrid-electric, and battery-electric vehicles. System 100 includes a battery pack coolant loop 102, a cabin coolant loop 104 and a power electronics coolant loop 106, also referred to as PE coolant loop 106. The term "coolant loop" is used as a coolant, which is a liquid coolant in the preferred embodiment such as ethylene glycol, circulates in the loop. It should be understood that the coolant loops can provide both heating and cooling, depending on whether the coolant is heated or cooled as discussed in more detail below. It should also be understood that the PE coolant loop is typically only used for cooling of the power electronics components in the PE coolant loop 106, as discussed below. Integrated battery thermal and occupant comfort system 100 is incorporated in a vehicle 10 (which is shown representatively by dashed line 10 in FIG. 1).

Battery pack coolant loop 102 includes a battery pack 108 that provides electric power to an electric traction motor 132 of the vehicle, a coolant pump 110 (referred to as battery pack coolant pump 110), a radiator 112 (referred to as battery pack radiator 112), a chiller 114, a controllable valve V4 and another controllable valve V5.

Cabin coolant loop 104 includes a coolant pump 116 (referred to as HVAC coolant pump 116), a coolant heater 118, a heater core 120, a controllable valve V1 and another controllable valve V3. Coolant heater 118 may illustratively be a positive thermal coefficient ("PTC") type of heater or a resistive heater, but could be other types of heaters.

PE coolant loop 106 includes a radiator 122 (referred to as PE radiator 122), a coolant pump 124 (referred to as PE coolant pump 124), power electronics 126 and a controllable valve V2. Power electronics 126 may include components and systems such as DC/DC converter and inverter 128, power switching devices 130, electric traction motor 132 and battery charger 134. The components and systems of power electronics 126 include coolant passages (not shown) through which coolant passes to cool the respective components and systems.

With reference to battery pack coolant loop 102, battery pack 108 includes coolant passages (not shown) through which coolant passes to heat or cool the battery pack 108. A coolant inlet port 136 of battery pack 108 is coupled to an outlet port 138 of battery pack coolant pump 110 and a coolant outlet port 140 of battery pack 108 is coupled to an inlet port 142 of controllable valve V4. Controllable valve V4 has three outlet ports, first outlet port V4-A, second outlet port V4-B and third outlet port V4-C. First outlet port V4-A is coupled to a coolant inlet port 150 of battery pack radiator 112. A coolant outlet port 152 of battery pack radiator 112 is coupled to an inlet port 154 battery pack coolant pump 110. Third outlet port V4-C of controllable valve V4 is coupled to an inlet port 156 of controllable valve V5.

Controllable valve V5 has three outlet ports, first outlet port V5-A, second outlet port V5-B and third outlet port V5-C. First outlet port V5-A is coupled to inlet port 154 of battery pack coolant pump 110. Second outlet port V5-B is coupled to an inlet port 164 of chiller 114. Third outlet port V5-C is coupled to an inlet port 166 of PE coolant pump 124 of PE coolant loop 106. An outlet port 168 of chiller 114 is coupled to inlet port 154 of battery pack coolant pump 110.

With reference to PE cooling loop 106, the heat generating components of PE coolant loop 106 are shown (DC/DC converter & inverter 128, power switching devices 130, electric traction motor 132 and battery charger 134) coupled in series between an outlet port 170 of PE cooling pump 124 and an inlet port 172 of controllable valve V2. It should be understood that they could be coupled in a different sequence than shown in FIG. 1, in a parallel as opposed to a series configuration, or a series/parallel configuration.

Controllable valve V2 has three outlet ports, first outlet port V2-A, second outlet port V2-B and third outlet port V2-C. First outlet port V2-A is coupled to an inlet port 180 of PE radiator 122. An outlet port 182 of PE radiator 122 is coupled to the inlet port 166 of PE coolant pump 124. Second outlet port V2-B of controllable valve V2 is coupled to an inlet port 184 of HVAC coolant pump 116 of cabin coolant loop 104. Third outlet port V2-C of controllable valve V2 is coupled to inlet port 154 of battery pack coolant pump 110.

With reference to cabin coolant loop 104, an outlet port 186 of HVAC coolant pump 116 is coupled to an inlet port 188 of coolant heater 118 and an outlet port 190 of coolant heater 118 is coupled to an inlet port 192 of controllable valve V3.

Controllable valve V3 has two outlet ports, first outlet port V3-A and second outlet port V3-B. First outlet port V3-A is coupled to an inlet port 198 of heater core 120 and second outlet port V3-B is coupled to inlet port 156 of controllable valve V5.

An outlet port 200 of heater core 120 is coupled to an inlet port 202 of controllable valve V1.

Controllable valve V1 has two outlet ports, first outlet port V1-A and second outlet port V1-B. First outlet port V1-A is coupled to inlet port 166 of PE coolant pump 124 of PE coolant loop 106 and second outlet port V1-B is coupled to inlet port 184 of HVAC coolant pump 116.

Each of controllable valves V1, V2, V3, V4 and V5 have control inputs 208, 210, 212, 214, 216, respectively, coupled to outputs 218, 220, 222, 224, 226, respectively, of a controller 228.

FIG. 2 is a state table showing the states for controllable valves V1, V2, V3, V4 and V5 for various cabin and battery heating modes where certain of the cabin heating modes also include battery cooling modes and a battery pack recirculation mode. The columns for each controllable valve show its output port which is coupled to its input port for each mode, the modes shown in the left hand column of the state table.

In mode 1, the cabin of the vehicle is heated with heat generated by the components of power electronics 126 of PE coolant loop 106. Controller 228 controls controllable valves V1-V5 so that the inlet port 202 of controllable valve V1 is coupled to its first outlet port V1-A, inlet port 172 of controllable valve V2 is coupled to its second outlet port V2-B, inlet port 192 of controllable valve V3 is coupled to its first outlet port V3-A. Depending on whether battery pack recirculation or cooling is desired, inlet port 142 of controllable valve V4 is coupled to either its first outlet port V4-A or third outlet port V4-C, and inlet port 156 of controllable valve V5 is coupled to either its first outlet port V5-A or V5-C. In this mode, coolant heated by the components of power electronics 126 in PE coolant loop 106 flows through controllable valve V2 into cabin coolant loop 104 at the inlet port 184 of HVAC coolant pump 116 and then through controllable valve V3 to inlet port 198 of heater core 120 and then through heater core 120 where it is used to heat the cabin of the vehicle. Coolant exiting cabin coolant loop 104 at outlet port 200 of heater core 120 flows through controllable valve V1 into PE coolant loop 106 at the inlet port 166 of PE coolant pump 124.

In an aspect of the present disclosure, the temperature of the individual cells of battery pack 108 are maintained at the same temperature by using the battery pack recirculation mode if there is no need to heat or cool battery pack 108. In battery pack recirculation mode, coolant recirculates in battery pack coolant loop 102 from battery pack coolant pump 110, through battery pack 108, through controllable valves V4 and V5 back to battery pack coolant pump 110 without any thermal input other than that provided by the individual cells of battery pack 108. In battery pack recirculation mode, inlet port 142 of controllable valve V4 is coupled to its third outlet port V4-C and inlet port 156 of controllable valve V5 is coupled to its first outlet port V5-A.

In battery pack cooling mode, coolant is circulated through battery pack radiator 112 or chiller 114, depending on how much cooling is needed. Battery pack radiator 112 is used for cooling battery pack 108 unless the demand for cooling exceeds the cooling capability of battery pack radiator 112, in which case chiller 114 is used to cool battery pack 108. When battery pack radiator 112 is for cooling battery pack 108, inlet port 142 of controllable valve V4 is coupled to its first outlet port V4-A. Since no coolant will be flowing to controllable valve V5, it is left unpowered. In this mode of cooling of battery pack 108, coolant flows from battery pack coolant pump 110, through battery pack 108, through controllable valve V4 to battery pack radiator 112, and through battery pack radiator 112 back to inlet port 154 of battery pack coolant pump 110. When chiller 114 is used for cooling battery pack 108, inlet port 142 of controllable valve V4 is coupled to its third outlet port V4-C and inlet port 156 of controllable valve V5 is coupled to its second outlet port V5-B. In this cooling mode, coolant flows from battery pack coolant pump 110 through battery pack 108, through controllable valve V4 to inlet port 156 of controllable valve V5, through controllable valve V5 to chiller 114, and through chiller 114 back to inlet port 154 of battery pack coolant pump 110. It should be understood that chiller 114 may illustratively be a component of a vehicle air conditioning system, such as an evaporator.

In Mode 2, battery pack 108 is heated with heat generated by the power electronics components in PE coolant loop 106. Controller 228 controls controllable valves V1, V2, V3, V4, V5 so that inlet port 202 of controllable valve V1 is coupled to its second outlet port V1-B, inlet port 172 of controllable valve V2 is coupled to its third outlet port V2-C, inlet port 192 of controllable valve V3 is coupled to its first outlet port V3-A, inlet port 142 of controllable valve V4 is coupled to its third outlet port V4-C and inlet port 156 of controllable valve V5 is coupled to its third outlet port V5-C. Coolant heated by power electronics components in PE coolant loop 106 flows through controllable valve V2 into battery pack coolant loop 102 at inlet port 154 of battery pack coolant pump 110, through battery pack 108, and through controllable valve V4 back to PE coolant loop 106 at inlet port 166 of PE coolant pump 124. Coolant in cabin coolant loop 104 flows in a recirculating path in cabin coolant loop 104 from HVAC coolant pump 116 through coolant heater 118 (which is deenergized), through heater core 120 and back to inlet port 184 of HVAC coolant pump 116.

In Mode 3, battery pack 108 is heated with heat generated by coolant heater 118. Controller 228 controls controllable valves V2-V5 so that inlet port 172 of controllable valve V2 is coupled to its first outlet port V2-A, inlet port 192 of controllable valve V3 is coupled to its second outlet port V3-B, inlet port 142 of controllable valve V4 is coupled to its second outlet port V4-B, inlet port 156 of controllable valve V5 is coupled to its first outlet port V5-A. Valve V1 is left unpowered. In this mode, coolant flows in a loop through HVAC coolant pump 116, coolant heater 118 (which is energized), through controllable valve V3 to controllable V5, through controllable valve V5 to battery pack coolant pump 110, through battery pack 108, through controllable valve V4 back to inlet port 184 of HVAC coolant pump 116. Coolant also recirculates in PE coolant loop 106 from PE coolant pump 124, through the components of power electronics 126, through controllable valve V2 to PE radiator 122, through PE radiator 122 back to inlet port 166 of PE coolant pump 124.

In Mode 4, battery pack 108 and the vehicle cabin are heated with heat generated by coolant heater 118. Controller 228 controls controllable valve so that the inlet port 202 of controllable valve V1 is coupled to its first outlet port V1-A, inlet port 172 of controllable valve V2 is coupled to its third outlet port V2-C, inlet port 192 of controllable valve V3 is coupled to its first outlet port V3-A, inlet port 142 of controllable valve V4 is coupled to its second outlet port V4-5, and V5 is left unpowered. In this mode, coolant flows through HVAC coolant pump 116, through coolant heater 118, through controllable valve V3 to heater core 120, through heater core 120, through controllable valve V1 to PE coolant pump 124, through power electronics components in PE coolant loop 106, through controllable valve V2 to battery pack coolant pump 110, through battery pack 108, and through controllable valve V4 back to inlet port 184 of HVAC coolant pump 116.

In Mode 5, the vehicle cabin is heated with heat generated by coolant heater 118. Controller 228 controls controllable valves V1 and V3 so that inlet port 202 of controllable valve V1 is coupled to its second outlet port V1-B and inlet port 192 of controllable valve V3 is coupled to its first outlet port V3-A. In this mode, coolant recirculates in cabin coolant loop 104. Coolant flows from HVAC coolant pump 116 through coolant heater 118 (which is energized), through controllable valve V3 to heater core 120, through heater core 120, through controllable valve V1 back to inlet port 184 of HVAC coolant pump 116. Controller 228 also controls controllable valves V2, V4 and V5 depending on whether battery cooling, heating (with heat generated by the components of power electronics 126 of PE coolant loop 126) or recirculation is desired. In this regard, controller 228 controls controllable valves V4 and V5 as discussed above with respect to mode 1 depending on whether battery pack recirculation or cooling is desired and if battery cooling is desired, whether to use the battery pack radiator 112 or chiller 114 to cool battery pack 108.

In Mode 6, battery pack 108 and the vehicle cabin are heated with heat generated by the components of power electronics 126 of PE coolant loop 106. Controller 228 controls controllable valves V1-V4 so that inlet port 202 of controllable valve V1 is coupled to its first outlet port V1-A, inlet port 210 of controllable valve V2 is coupled to its third outlet port V2-C, inlet port 192 of controllable valve V3 is coupled to its first outlet port V3-A, and inlet port 142 of controllable valve V4 is coupled to its second outlet port V4-B. V5 is left unpowered since no coolant flows through it in this mode. In this mode, coolant flows through PE coolant pump 124 through the components of power electronics 126 in PE coolant loop 106 where it is heated. This heated coolant flows through controllable valve V2 to battery pack coolant pump 110, through battery pack coolant pump 110, through battery pack 108, through controllable valve V4 to HVAC coolant pump 116, through coolant heater 118 (which is deenergized), through controllable valve V3 to heater core 120, through heater core 120, through controllable valve V1 back to inlet port 166 of PE coolant pump 124.

It should be understood that there are various configurations of valves and types of valves that can be used to provide battery coolant loop 102, cabin coolant loop 104 and PE coolant loop 106 and that the foregoing description of battery coolant loop 102, cabin coolant loop 104 and PE coolant loop 106 is exemplary and not exhaustive. For example, valves V1-V5 could be proportional valves, or modulated to switch their respective inlets between a plurality of their respective outlets so as to provide flow from their respective inlets to a plurality of their outputs in any particular mode. Also, when references are made to the controller controlling the controllable valves, as would be understood by one of ordinary skill in the art the controller is so configured to do so.

What is claimed is:

1. In a motor vehicle having an electric traction motor and a battery pack that provides power to the motor, the battery pack including a plurality of battery cells, a thermal system comprising;

a. a battery pack coolant loop, a cabin coolant loop, a power electronics coolant loop and a plurality of controllable valves controlled by a controller to select thermal modes by controlling flow paths of coolant in one or more of the coolant loops; and b. the controller configured to control the controllable valves when in a first cabin only heating mode to circulate liquid coolant through power electronics in the power electronics coolant loop and through a heater core in the cabin cooling loop to utilize heat generated by the power electronics to heat the cabin, the controller configured to control the controllable valves when in a second cabin only heating mode to circulate liquid coolant through an energized coolant heater in the cabin coolant loop and the heater core to utilize heat generated by the coolant heater to heat the cabin, and the controller further including a battery pack recirculation mode and configured to control the controllable valves when in the first or second cabin only heating mode and the battery pack recirculation mode to recirculate liquid coolant flowing in the battery pack coolant loop so that it flows through the battery pack without any thermal input to heat or cool the battery pack other than that provided by the battery pack to maintain the battery cells of the battery pack at essentially the same temperature.

2. The thermal system of claim 1, wherein the controller includes a battery pack heating mode, the controller when in the battery pack heating mode configured to control the controllable valves to circulate liquid coolant through the power electronics in the power electronics coolant loop and through the battery pack to heat the battery pack with heat generated by the power electronics.

3. The thermal system of claim 2, wherein the controller includes a second battery pack heating mode, the controller when in the second battery pack heating mode configured to control the controllable valves to circulate liquid coolant through an energized coolant heater in the cabin coolant loop and the battery pack to heat the battery pack with heat generated by the energized coolant heater.

4. The thermal system of claim 3, wherein the controller includes a cabin and battery pack heating mode, the controller when in the cabin and battery pack heating mode configured to control the controllable valves to circulate liquid coolant through the power electronics, a heater core in the cabin coolant loop and the battery pack to heat the cabin and the battery pack with heat generated by the power electronics.

5. The thermal system of claim 4, wherein the controller includes a second cabin and battery pack heating mode, the controller when in the second cabin and battery pack heating mode configured to control the controllable valves to circulate liquid coolant through an energized coolant heater in the cabin coolant loop and through the heater core and battery pack to heat the cabin and battery pack with heat generated by the energized coolant heater.

6. The thermal system of claim 1, wherein the controller includes a cabin and battery pack heating mode, the controller when in the cabin and battery pack heating mode configured to control the controllable valves to circulate liquid coolant through the power electronics, a heater core in the cabin coolant loop and the battery pack to heat the cabin and the battery pack with heat generated by the power electronics.

7. The thermal system of claim 6, wherein the controller includes a second cabin and battery pack heating mode, the controller when in the second cabin and battery pack heating mode configured to control the controllable valves to circulate liquid coolant through an energized coolant heater in the cabin coolant loop and through the heater core and battery pack to heat the cabin and battery pack with heat generated by the energized coolant heater.

8. The thermal system of claim 1, wherein the controller includes a battery pack cooling mode, the controller when in the battery pack cooling mode configured to control the controllable valves when in the first or second cabin only heating mode and in the battery pack cooling mode to recirculate liquid coolant through either a battery pack radiator in the battery pack coolant loop or through a chiller in the battery pack coolant loop to cool the battery pack.

* * * * *